United States Patent

[11] 3,568,575

| [72] | Inventor | Albert Hagen<br>Dortmund, Germany |
|---|---|---|
| [21] | Appl. No. | 808,550 |
| [22] | Filed | Mar. 19, 1969 |
| [45] | Patented | Mar. 9, 1971 |
| [73] | Assignee | Eisenwerk Rothe Erde GmbH<br>Dortmund, Germany |
| [32] | Priority | Apr. 8, 1968 |
| [33] | | Germany |
| [31] | | P 17 59 191.2 |

[54] PRESSURE FLUID OPERABLE EXCAVATING MACHINE
7 Claims, 5 Drawing Figs.

[52] U.S. Cl.............................................. 92/56,
92/66, 92/76, 92/118, 92/138, 92/146, 188/152, 91/41
[51] Int. Cl......................................................... F01b 15/04
[50] Field of Search........................................... 180/79.2,
79.3, 79.4; 188/(Inquired); 192/85 (AT); 74/129,
128, 126; 92/61, 68, 31, 117, 118, 51, 54, 66, 161,
56, 138, 146; 91/176, 363

[56] References Cited
UNITED STATES PATENTS

| 2,947,187 | 8/1960 | Graff et al.............. | 92/68UX |
| 3,230,838 | 1/1966 | Westbrook.............. | 91/363X |

FOREIGN PATENTS

| 1,083,008 | 1954 | France.................. | 192/85AT |

Primary Examiner—Martin P. Schwadron
Assistant Examiner—Allen M. Ostrager
Attorney—Walter Becker

ABSTRACT: For use in connection with an implement, especially of the excavating and earth-working type, which has a rotatable part and a part normally held stationary during the working of the implement, a turntable which includes: a supporting member connectable to a stationary part, a plurality of antifriction bearing means supported by said supporting member along a circular path, a rotatable member forming a platform and being connectable to a rotatable part, fluid operable cylinder piston means having one element thereof pivotally connected to one of said members, rotatable brake or braking means operatively connected to another element of said cylinder piston means and operable selectively to establish a coupling connection of said other element with the other one of said members and to interrupt said brake connection to permit movement of said other element relative to said other member.

Patented March 9, 1971 3,568,575
3 Sheets-Sheet 1
FIG-1
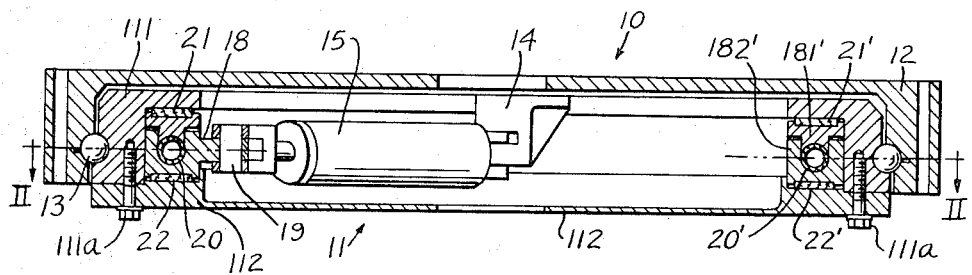
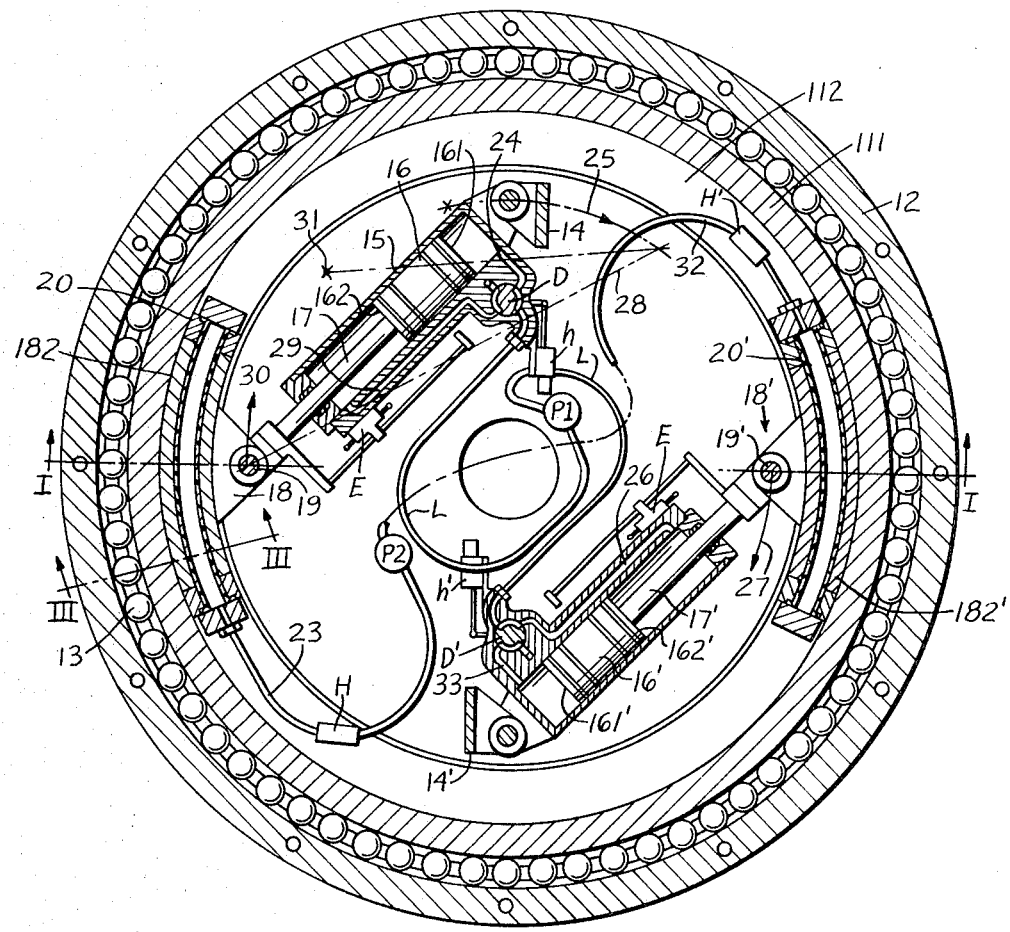
FIG-2
INVENTOR
ALBERT HAGEN
BY
Walter Becky Patented March 9, 1971

INVENTOR
ALBERT HAGEN

BY

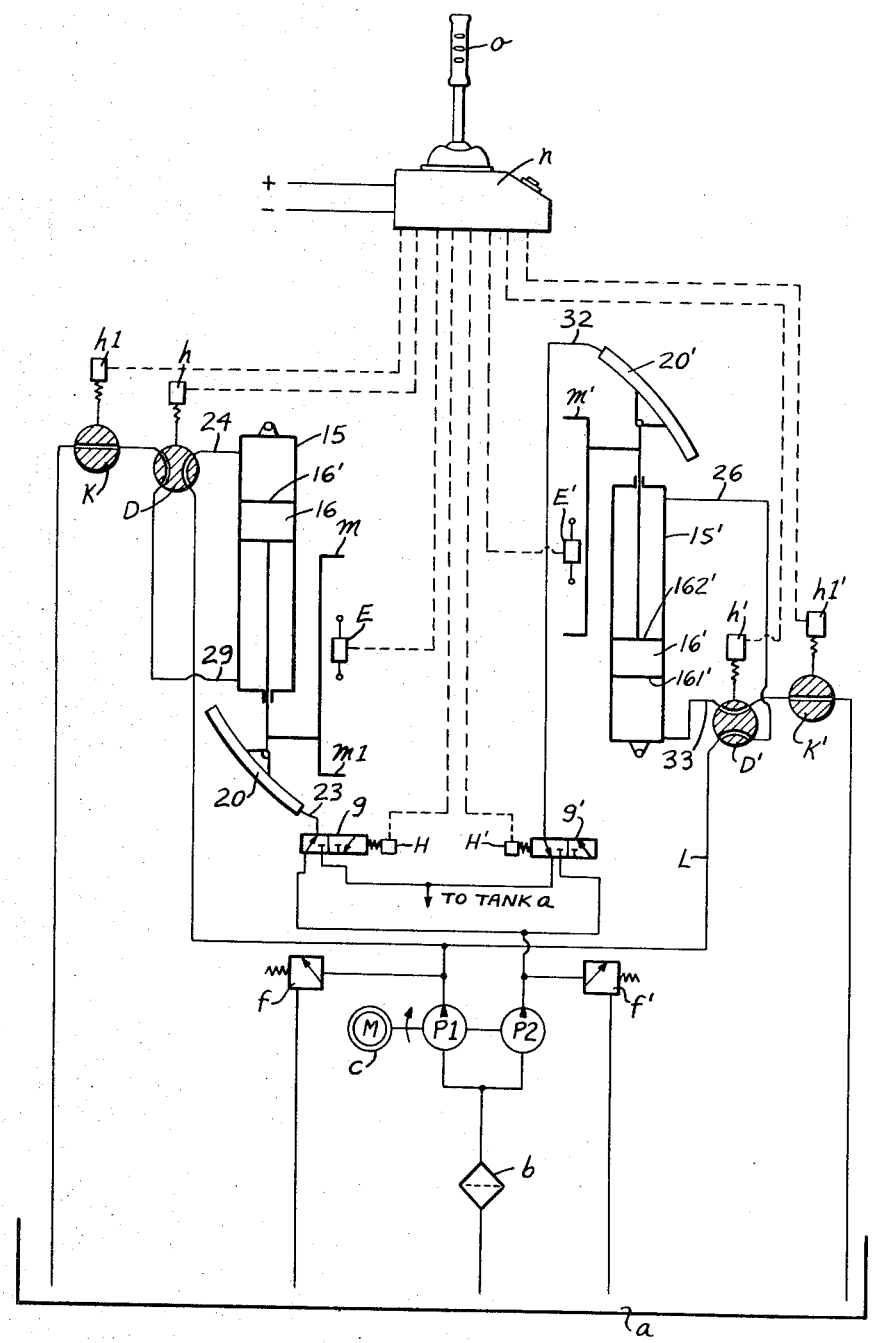

PRESSURE FLUID OPERABLE EXCAVATING MACHINE

The present invention relates to a pressure fluid operable excavating machine which comprises an upper carriage and a lower carriage while having interposed therebetween a ball turntable.

Customarily, the rotary movement of the upper carriage is carried out by means of an electric motor which actuates a pinion meshing with a gear rack mounted on the turntable in the form of a gear ring which may be provided with inner or outer teeth. The load acting in this connection on the turntable will generally cause elastic deformations since the forces involved are not merely simple forces but produce torques. These elastic deformations interfere with the meshing of the inner or outer teeth of the gear ring and the pinion engaging the same. The load on the teeth does not act uniformly on the entire width of the teeth so that forces act on the edges of the teeth with the result that the teeth might break.

The broad idea underlying the present invention consists in using the fluid pressure medium which is employed for the control of the individual working operations of the bucket or of the shovel of the excavating machine also for driving the upper carriage. This would simultaneously overcome at least to a great extent the drawbacks which have been encountered when employing mechanical driving and transmission elements.

It is known to use hydrostatic driving devices by means of an oscillating cylinder. Furthermore, solutions have become known for the automatic control of an oscillating cylinder in the dead center points thereof.

On the basis of the above, the specific problem underlying the present invention consists in providing a pressure fluid operable drive for the upper carriage of an excavating machine.

It is another object of this invention to provide a pressure fluid operable drive as set forth in the preceding paragraph which will be equipped with supporting or counter bearings cooperating with the inner ring fixedly mounted on the lower carriage.

These and other objects and advantages of the invention will appear more clearly from the following specification in connection with the accompanying drawings, in which:

FIG. 1 is a section through a ball turntable with a double-acting cylinder shown in view, said section being taken along the line I–I of FIG. 2;

FIG. 2 represents a horizontal section through the ball turntable with two double-acting cylinders, said section being taken along the line II–II of FIG. 1;

FIG. 5 shows a control diagram for use in connection with the present invention.

The excavating machine according to the present invention is characterized primarily in that the drive of the upper carriage is effected by means of at least two fluid pressure operable double-acting cylinders which are arranged in the free inner space of the inner ring and extend perpendicularly with regard to the axis of rotation of the upper carriage, while the closed end faces of the cylinders are pivotally connected to the outer ring connected to the upper carriage, and the free piston ends pivotally engage supporting bearings arranged on the inner ring.

Preferably, the inner ring is divided and has a C-shaped cross section open at its inner side. Between the upper ring and the lower ring which are detachably interconnected to each other, the remaining free cross section receives the supporting bearings. According to a further feature of the present invention, the supporting bearings comprise an upper and a lower pressure plate and an elastic pressure hose establishing a connection between the two pressure plates and having one end connected to a fluid pressure conduit. The pressure plates which guide each other surround the elastic pressure hose on all sides and are guided by the upper ring and the lower ring of the inner rings. The outer surfaces of the pressure plates which extend perpendicularly with regard to the axis of rotation are provided with friction linings. The arrangement of a drive according to the invention not only assures the freedom of the center of the ball turntable but furthermore permits a jerk-free starting of the turning and pivotal movements.

Figure 4:
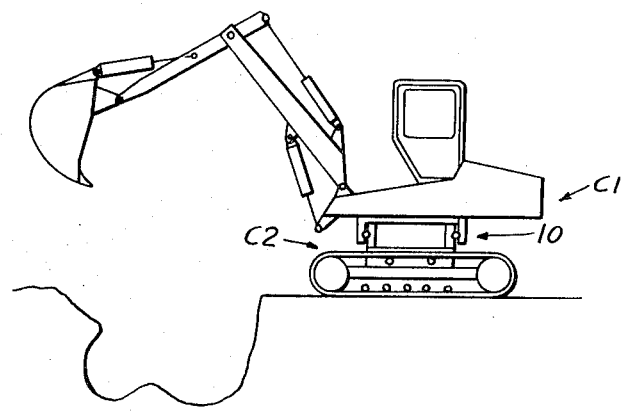
FIG. 4 is a diagrammatic overall view of an earth working machine equipped with a turntable according to the present invention.

Referring now to the drawings in detail, only the ball turntable with the elements arranged thereon of a pressure fluid operable excavating machine has been shown in detail. As illustrated in FIG. 4, the rotatable upper carriage C1 of the excavating machine rests through the intervention of the ball turntable 10 upon a lower carriage C2 while the pivoting of the upper carriage C1 and the rotating movements thereof are carried out by means of a pressure fluid operable thrust drive. The control circuit for bringing about the individual control positions of the reversing valve as well as the conduits leading to the individual connections have been shown in FIG. 5 and will be explained further below.

As will be seen from FIG. 1, the ball turntable 10 comprises an inner ring 11 and an outer ring 12 with balls 13 therebetween. The inner ring 11 connected to the lower carriage C2 in any convenient manner, e.g. by bolts (not shown) is divided and comprises an upper ring 111 and a lower ring 112 detachably connected to the upper ring 111, e.g. by bolts 111a. The upper ring 111 and the lower ring 112 are so designed that together they form a C-shaped cross section open at the inner side of the inner ring 11. The outer ring 12 is screwed onto the upper carriage C1 and through the intervention of balls 13 rests on the inner ring 11. In the interior of the ball turntable 10 on the outer ring 12 there are provided brackets 14, 14' for supporting double-acting cylinders 15, 15'. These cylinders 15, 15' are tiltably arranged in planes perpendicular to the ideal axis of rotation of the upper carriage and have reciprocably mounted therein pistons 16, 16' which through piston rods 17, 17' are connected to supporting bearings 18, 18'. The supporting bearings 18, 18' are supported by the inner ring 11. Inasmuch as the bearings 18, 18' have no fixed point on the inner ring 11, the connection of the piston rods 17, 17' with the supporting bearings 18, 18' is a pivotal connection by means of pivots 19, 19'.

The supporting bearings 18, 18' are each composed of an upper pressure plate 181 (FIG. 3) and a lower pressure plate 182 as well as an elastic pressure hose 20, 20' which is introduced between the two pressure plates 181 and 182 in such a manner that these pressure plates surround the pressure hose from all sides. This applies to the rest position of the pressure hose 20, 20' and also when the pressure plates 181, 182 which guide each other are being moved. It will be evident that the pressure hose 20, 20' has its entire circumference always in engagement with the pressure plates 181, 182. The supporting bearing 18, 18' is received and guided by the free portion of the C-shaped cross section of the inner ring 11.

The outer surfaces of the pressure plates 181, 182 which surfaces extend perpendicularly with regard to the axis of rotation, are covered with friction linings 21, 22 which cooperate with the plane parallel fitting surfaces of the upper ring 111 receiving the supporting bearings 18, 18' and of the lower ring 112.

FIG. 5 shows a control diagram for the control of the cylinder piston system 15, 16 and 15', and 16' as well as the control for the elastic pressure hoses 20, 20'. The control of the cylinder piston systems 15, 16 and 15', 16' is effected by means of the two-way valves D and D' respectively to which pressure fluid is conveyed by a pump P1. Pump 1 has its suction side connected through a filter $b$ with a fluid reservoir or tank $a$. The control of the supply of pressure fluid to and release of fluid from hoses 20 and 20' is effected through control valves or 3/2 way valves $g$, $g'$ respectively which communicate with a pump P2 having its suction side likewise connected to reservoir $a$ through filter $b$. The valve spools of control valves g, g' are electrically controlled, e.g. by solenoids H and H' respectively which in their turn are remote controlled by a control lever o of a control device n. The two-way valves D, D' are controlled by solenoids h and h' likewise electrically connected to control device n.

The control circuit of FIG. 5 also comprises limit switches E and E' for limiting the stroke of the pistons 16, 16' in either direction. The said limit switches are electrically connected to control device n and cooperate with abutments m, m1 and m', m1'. Finally, the circuit comprises shutoff valves k, k' controlled by solenoids h1 and h1' respectively and also comprises check valves f and f'.

Figure 3:
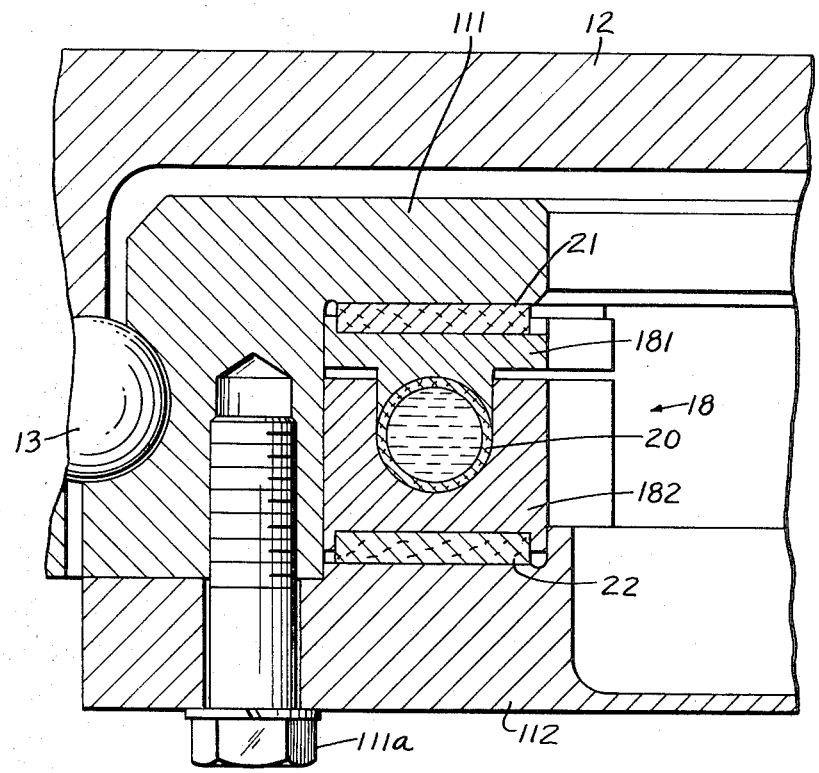
FIG. 3 illustrates on a larger scale than FIGS. 1 and 2 a portion of the ball turntable in cross section along the line III–III of FIG. 2.

The operation of the drive for the upper carriage is as follows: By means of the solenoid controlled valve g, pressure fluid from pump P2 is conveyed through a conduit 23 to the elastic pressure hose 20 (FIGS. 3 and 5). In view of the transmission of the pressure fluid, the elastic pressure hose 20 expands radially, the two pressure plates 181, 182 are pressed away from each other, and the friction linings 21, 22 will establish a frictional connection with the upper ring 111 and the lower ring 112 so that the supporting bearing 18 for the piston 16 is firmly clamped to the inner ring 11. Simultaneously, with the actuation of the elastic pressure hoses 20, pressure fluid from pump P1 acts through a conduit 24 and solenoid controlled two-way valve D connected to cylinder 15 upon that piston surface 161 which faces away from the piston rod 17, and similarly pressure fluid acts through valve D' and line 26 upon piston surface 162'. Since the cylinders 15, 15' are pivotally connected through brackets 14 and 14' to the outer ring 12 and the upper carriage, the pressure fluid also initiates the rotary movement of the upper carriage in the direction of the arrow 25 (FIG. 2).

During this operation, the elastic hose 20' of the supporting bearing 18' is without pressure. Inasmuch as the supporting bearing 18' is, therefore, at this time not connected to the inner ring 11, the supporting bearing 18' will be free while the fluid pressure medium is acting upon the piston surface 162', to slide in the direction of the arrow 27 in the inner ring 11.

When the piston 16 has reached its lower dead center point so that the cylinder 15 and the piston rod 17 have assumed the position 28 indicated by a dot-dash line, by reversing the control, the elastic pressure hose 20 becomes pressureless and the frictional connection of the pressure bearing 18 with the inner ring 11 is eliminated. By causing the pressure fluid medium to act upon the piston surface 162 of the piston 16 through conduit 29, the supporting bearing 18 slides in the direction of the arrow 30 to the position 31 for the next clamping operation.

Simultaneously with the guiding of the piston 16 from its lower dead center position to its upper dead center position, following a reversing of the control, the elastic pressure hose 20 ' is through the conduit 32 and the piston surface 161' acted upon by pressure fluid through conduit 33 whereby the rotary movement of the upper carriage in the direction of the arrow 25 will be continued.

Generally, when employing the excavating machine, it is merely necessary to pivot the upper carriage within a range of from 0° to 90° which means that the piston stroke does not always have to be over its entire length. A reversing of the control from one direction of movement to the opposite direction of movement is necessary. This reversing is obtained by means of reversing two-way valves D, D'. More specifically, this reversing control works in such a way that simultaneously with the introduction of the pressure medium through conduit 29, the pressure medium will also act upon the elastic hose 20 through the conduit 23 whereby the supporting bearing 18 will be clamped in. In an analogous manner, the pressure fluid for the relief of the supporting bearing 18' is effected and the actuation of the piston surface 16' is brought about.

For purposes of braking the outer ring 12, the elastic hoses 20, 20' are acted upon simultaneously, and the conduit leading to the cylinders 15, 15' is made pressureless.

It is, of course, understood that the present invention is not limited to its use in connection with excavating machines, but may also be employed for other devices, implements, installations and apparatuses in which rotary turntables are provided for transmitting forces from a pivotal or rotatable part to a nonrotatable part. As the expansion hoses prevent movement between a movable member with respect to a stationary member (thus preventing motion of the movable member), this structure is believed to constitute a "braking means." It is noted that a "clutch means" is generally defined as a connection between two rotatable or movable members. Accordingly, the terminology "brake or braking means" is believed more appropriate than the term "clutch means." The function and operative interconnection of the braking means with the other elements is such that in the present situation the braking means is rotatable with respect to the stationary member. Piston-cylinder means hold (or broadly brake) a first element stationary so that relative motion of a second element (usually the piston) is possible. The braking or holding means is rotatable and the foregoing clarification is being provided for clarity purposes.

It is also to be understood that the present invention is not limited to the particular construction shown in the drawings but also comprises any modifications within the scope of the appended claims.

I claim:

1. For use in connection with an implement, especially of the excavating and earth-working type, which has a rotatable part and a part normally held stationary during the working of the implement, a turntable which includes: a supporting member connectable to a stationary part, a plurality of antifriction bearing means supported by said supporting member along a circular path, a rotatable member forming a platform and being connectable to a rotatable part, fluid operable cylinder piston means having one element thereof pivotally connected to one of said members, rotatable braking means operatively connected to another element of said cylinder piston means and operable selectively to establish a coupling connection of said other element with the other one of said members and to interrupt said braking connection to permit movement of said other element relative to said other member.

2. A turntable according to claim 1, in which said cylinder piston means has one of its two elements formed by the cylinder means and the piston rod means thereof pivotally connected to said rotatable member and has its other one of said two elements pivotally connected to said braking means.

3. A turntable according to claim 1, in which said supporting member is formed by two annular sections detachably connected to each other so as to define a C-shaped cross section with the free ends of said C-shaped cross section facing the axis of rotation of said turntable.

4. A turntable according to claim 3, in which said braking means are interposed between said two annular sections of said supporting member and are located within the space defined by the inner sides of said C-shaped cross sectional part of said supporting member.

5. A turntable according to claim 4, in which said braking means comprises upper pressure member means, lower pressure member means, and hose means interposed between said upper and lower pressure member means and provided with means for selectively conveying pressure fluid into or releasing fluid from said hose means to thereby respectively establish or interrupt braking connection between said supporting member and said upper and lower pressure member means.

6. A turntable according to claim 5, in which said upper and lower pressure member means are provided with guiding surfaces for guiding each other in their movement during the establishment and interruption of said braking connection with said supporting member, said hose means having its peripheral surface fully surrounded by said upper and lower pressure member means.

7. A turntable according to claim 4, which includes friction lining means interposed between said upper and lower pressure member means and adjacent surfaces of said supporting member.